United States Patent
Doddridge (10) Patent No.: US 9,228,922 B1
(45) Date of Patent: Jan. 5, 2016

(54) OPTICAL TIME DOMAIN REFLECTOMETER CALIBRATION STANDARD

(71) Applicant: Lance S. Doddridge, Ontario, CA (US)

(72) Inventor: Lance S. Doddridge, Ontario, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 274 days.

(21) Appl. No.: 14/068,002

(22) Filed: Oct. 31, 2013

(51) Int. Cl.
*G01M 11/02* (2006.01)
*G02B 6/44* (2006.01)
*G01M 11/00* (2006.01)

(52) U.S. Cl.
CPC ...... *G01M 11/3109* (2013.01); *G01M 11/3136* (2013.01); *G02B 6/4457* (2013.01)

(58) Field of Classification Search
CPC .................................................. G02B 6/4457
See application file for complete search history.

(56) References Cited

U.S. PATENT DOCUMENTS

| 5,072,111 | A | * | 12/1991 | Gilino | G01M 11/3145 250/227.15 |
|---|---|---|---|---|---|
| 5,534,994 | A | * | 7/1996 | Hanson | G01M 1/3109 356/73.1 |
| 6,533,216 | B1 | * | 3/2003 | Bumgarner | B65H 75/14 242/118.41 |
| 7,016,024 | B2 | * | 3/2006 | Bridge | G01M 1/3109 356/73.1 |
| 7,356,236 | B1 | | 4/2008 | Huang et al. | |
| 2002/0009278 | A1 | * | 1/2002 | Fingler | G02B 6/4453 385/135 |
| 2007/0132985 | A1 | * | 6/2007 | Palmieri | G01M 11/3181 356/73.1 |
| 2013/0155391 | A1 | * | 6/2013 | Achten | G01N 21/84 356/73.1 |

OTHER PUBLICATIONS

Calibration of Optical Time-Domain Reflectometers (OTDR), CEI/IEC 61746, International Electrotechnical Commission, Geneva, Switzerland, Second edition, 2005, pp. 1-13 & 35-61.

* cited by examiner

*Primary Examiner* — Michelle R Connelly
(74) *Attorney, Agent, or Firm* — Richard Morgan (57) ABSTRACT

The invention is a fiber optic cable calibration standard in combination with a device for calibrating distance and attenuation parameters of an optical time domain reflectometer (OTDR). The calibration standard includes a fiber optic cable spool assembly and inspection apparatus. The invention is also a calibration method. An OTDR to be calibrated against a National Institute of Standards and Technology (NIST) standard.

18 Claims, 7 Drawing Sheets

OPTICAL TIME DOMAIN REFLECTOMETER CALIBRATION STANDARD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to optics measuring and testing. More particularly, the invention relates to optical fiber cable measurement and inspection. The invention also relates to accessories for a fiber optic cable calibration standard. More particularly, the invention relates to spools for fiber optic cables.

2. Discussion of the Related Art

Optical time domain reflectometers (OTDR) are used to measure certain physical characteristics of fiber optic cables. The OTDR connects to only one end of a fiber optic cable. It sends a pulse of light into the fiber, which then travels down its length. Some light energy in the pulse is scattered and reflected back through the fiber optic cable and to the OTDR. Certain physical characteristics of the fiber optic cable reflect more energy back than others. The end of a fiber segment reflects back much more energy (called a Fresnel reflection) than the molecular structure of the fiber optic cable itself (Rayleigh scattering). The OTDR has an internal timer, which measures the time elapsed between the sending of the pulse, and any energy that is reflected and returned to the OTDR. If the speed of light in the fiber optic cable is known, the physical distance measured from the connection to the OTDR to the point where the light was reflected is calculated by:

$$d = \frac{c_f t}{2}$$

wherein: d is the physical distance to the point of reflection; $c_f$ is the speed of light in the medium of the fiber optic cable, and t is the elapsed time between the sending of the pulse by the OTDR and the reception of the reflected energy at the OTDR. The factor of 2 in the denominator accounts for the round-trip time t of the pulsed energy.

The speed of light in the fiber optic cable is dependent on the wavelength of the pulsed light. The relationship is given by:

$$c_f = \frac{c}{n(\lambda)}$$

wherein: c is the speed of light in a vacuum (exactly 299,792,458 meters/second by definition of the meter), $n(\lambda)$ is the index of refraction of the fiber optic cable at the wavelength, $\lambda$. The index of refraction is simply the ratio of the speed of light in a vacuum to the speed of light in the fiber optic medium, or:

$$n(\lambda) = \frac{c}{c_f}$$

Combining these equations gives the distance, d, in terms of the index of refraction, n, of the fiber, and the measured round-trip time, t, of the pulse of light in the fiber $$d = \frac{ct}{2n(\lambda)}.$$

A typical OTDR may include one or more pulsed light sources at one or more specific wavelengths. In order for the distance measurement of the OTDR to be meaningful, the index of refraction of the fiber to be measured must be entered into the OTDR, for the wavelength of the source used. With the index of refraction entered, the OTDR makes a time-based measurement, and calculates the distance using the above equation.

In the art, calibration of the OTDR is accomplished by using a sample spool of optical fiber of not well-known length, and not well-known index of refraction. The sample spool has been characterized for time-of-flight, or the time that a pulse of light of certain wavelength takes to travel through its length. The time-of-flight system is a time-based measurement standard. Once the time-of-flight is known for the sample spool, the OTDR is connected to it, and a distance measurement is performed. The result of the OTDR distance measurement will not correspond well with the actual physical length of the sample fiber. However, using the OTDR distance measurement and the index of refraction entered into the OTDR, a time-of-flight calculation can be made that shows the elapsed time measured by the OTDR. This equation is given by $$t = \frac{2n(\lambda)d}{c}.$$

Thus, the measured time-of-flight of the sample spool can be compared with the OTDR-measured time-of-flight, and the timing of the OTDR can be verified.

Commercially available fiber optic spools are 6-inch diameter, with 9-inch diameter retaining plates on either side and a width of 4.5-inch or more. The spools are constructed so that both ends of the fiber are accessible for use, which is important for time-of-flight measurements. However, when several spools of this size are used for a set of calibration standards, they take up a lot of space, which proves impractical for laboratory bench-top calibrations. Also, commercially available spools are made of assembled pieces fastened together. This design increases the chance that the fiber spooled onto it will get stuck in the cracks between the assembled pieces. Sticking in cracks adversely affects the reflective parameters of measurement spools. Commercially available spools are also relatively large in size.

From a practical standpoint, the verification of the OTDR timing can be difficult to interpret by the end-user. The end-user wants a distance measurement, not a time measurement. The calibration of the OTDR gives an optical fiber length in units of time, usually picoseconds, whereas the end-user would like to have length in meters or centimeters. Here-to-fore, there has been no standard available that allows for a direct length comparison between the OTDR distance measurement and a fiber optic distance standard.

SUMMARY OF THE INVENTION

The invention is a fiber optic cable calibration standard apparatus in combination with a device for calibrating distance and attenuation parameters of an optical time domain reflectometer (OTDR).

The apparatus of the invention includes a rack mountable enclosure including a front panel. The enclosure contains therein three fiber optic cable spool assemblies. Each assembly comprises a vertically elongated spindle attached to a horizontally disposed base plate. Fiber optic cable spools are rotatably mounted on each of the three spindles.

In the fiber optic cable spools, each spool comprises a drum portion and a flange portion. The drum portion comprises a major drum having a major drum fiber optic cable receiving surface having a first diameter and a minor drum having a second diameter of lesser magnitude than the first diameter.

The flange portion comprises a first terminal flange spaced by the drum portion from a second terminal flange and an intermediate flange there between. Each flange in the flange portion extends radially outwardly from the drum portion. The first terminal flange has a first terminal flange fiber optic cable contact surface in contact with the major drum fiber optic cable receiving surface. The intermediate flange is positioned between the first terminal flange and the second terminal flange separating the major drum from the minor drum. The intermediate flange has an aperture there through, directly adjacent the major drum fiber optic cable receiving surface. The aperture has a free area sufficient to pass a fiber optic cable length through the intermediate flange from the major drum fiber optic cable receiving surface to the minor drum. The intermediate flange has an intermediate flange fiber optic cable contact surface in contact with the major drum fiber optic cable receiving surface.

Each spool is made of a polymer material to form a single unitary body having smooth, gap-free fiber optic cable contact surfaces including between the first terminal flange fiber optic cable contact surface and the major drum fiber optic cable receiving surface and between the intermediate flange fiber optic contact surface and the major drum fiber optic cable receiving surface.

The first fiber optic cable spool assembly comprises a first set of fiber optic cable spools, each spool storing a different predetermined length of single-mode fiber optic cable.

The second fiber optic cable spool assembly comprises a second set of fiber optic cable spools, each spool storing a different predetermined length of multi-mode fiber optic cable.

The third fiber optic cable spool assembly comprises a third set of fiber optic cable spools. At least one spool stores a predetermined length of single-mode fiber optic cable. And at least one spool stores a predetermined length of multi-mode fiber optic cable.

Each fiber optic cable end is attached to a port on the front panel for access to the device for calibrating distance and attenuation parameters. A single-mode variable optical attenuator and a multi-mode variable optical attenuator are provided for attachment to a fiber optic cable. A display is provided for displaying parameters of fiber optic cables coupled to the ports.

DETAILED DESCRIPTION OF THE INVENTION

The invention referred to herein as (ADFOCS) is a fiber optic cable calibration standard in combination with a device for calibrating distance and attenuation parameters of an optical time domain reflectometer (OTDR). An attenuation and distance fiber optic cable calibration standard (ADFOCS) utilizes spooled fiber optic cable with a well-known length and well-known index of refraction assembled into a single, rack mountable enclosure which also includes a visual inspection scope for inspecting fiber optic cable connectors for cleanliness. By use of the invention, well-known lengths of fiber optic cables are measured allowing for a direct comparison in units of length, rather than time. From a practical standpoint, this is the more desirable method of comparison.

Since OTDR measurements are no more accurate than the index of refraction entered, the index of refraction for each of the spooled length of fiber optic cable is carefully characterized. This is done by measuring the time-of-flight through each length, and applying the following formula:

$$n(\lambda) = \frac{d}{ct}.$$

Thus, the index of refraction for wavelengths of interest is calculated. The OTDR to be calibrated is provided the well-known index of refraction of the ADFOCS sample spooled fiber optic cable. When the length of the sample spooled cable is measured by the OTDR, the result can be compared directly to the well-known length. The tolerances and uncertainties can be defined in terms of length rather than time. The OTDR is best calibrated using at least three different lengths of fiber optic cable.

Fiber optic cable spools of the invention are mounted on a spindle to produce the spool assembly. Each spool is a single, unitary body. The spool is configured to provide access to both ends of the spooled fiber optic cable making the spooled cable particularly useful for laboratory bench-top calibrations. The spool design eliminates the fiber sticking in cracks between spool constituent parts. It also allows a relatively large length of fiber to be spooled on the major drum and fed through an aperture to the minor drum, without crimping or catching the fiber in a crack. The spool size is also sufficiently compact for use in a rack mountable enclosure, but not too small so that bending losses become significant. Bending fiber over too small a diameter causes losses in the fiber known as "bending losses." Spool dimensions allow for mounting with standard commercially available optical bread-boarding hardware.

Figure 6A:
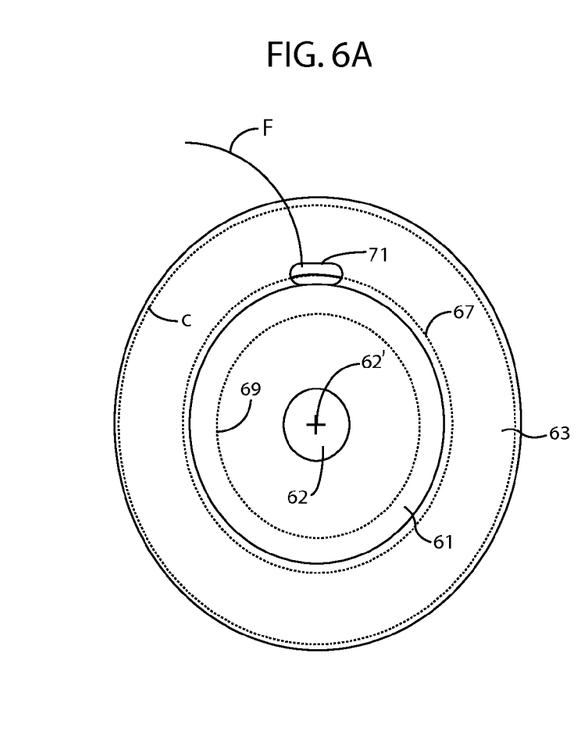
FIGS. 6A and 6B are detailed views of a single spool according to the invention.
Figure 6B:
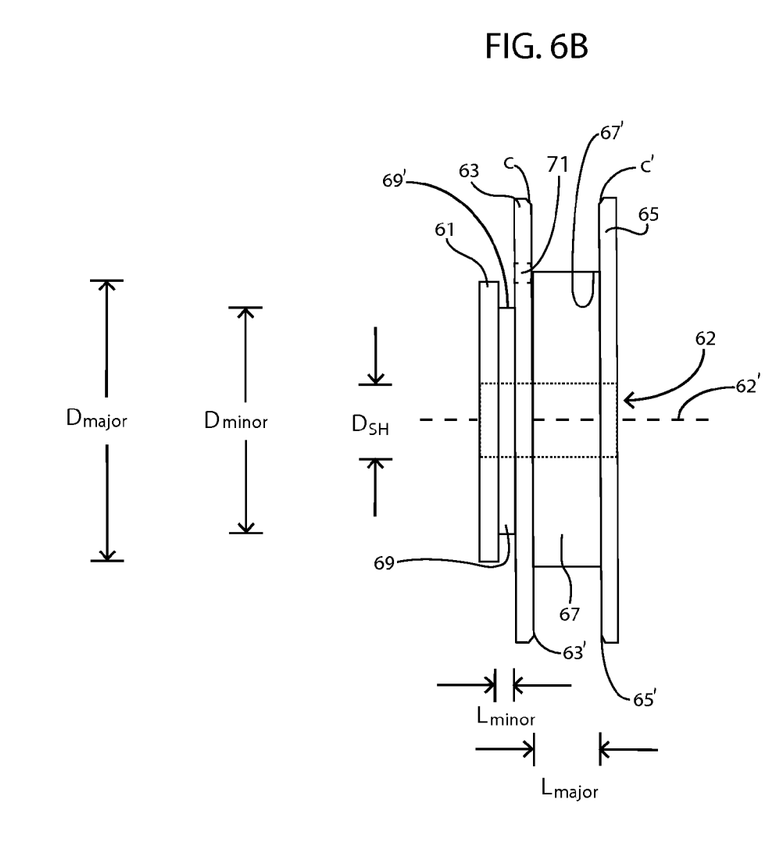

Each spool in the spool assembly is made by machining a single piece of constituent material. Preferred materials of construction are polymers such as polyoxymethylene polymer. Polyoxymethylene polymer is available under trade names including Delrin®, Celcon®, Duracon® and Hostaform®. This polymer is used in applications requiring stiffness, dimensional stability and a smooth surface. Spools of the invention are shaped from a single piece of polymer. The flanges and drums are machined on a lathe according to design dimensions. A spindle hole 62 is drilled to a diameter $D_{SH}$ to accommodate a spindle and has an axis 62' as shown in FIG. 6A and FIG. 6B. The aperture 71 in the intermediate flange 63 between the major drum 67 and minor drum 69 is machined on a milling machine. By machining the spools from a single piece of polymer, no gaps are present in the spool as there are no separate pieces that must be fit together. Polyoxymethylene polymer is relatively easy to machine and leaves a smooth surface. We have found that a smooth surface is necessary in order to avoid damaging the delicate cable during spooling. Alternate materials of construction include polymers with similar physical characteristics. Aluminum and aluminum alloys may also be used.

Spool dimensions are limited according to the invention to accommodate placing eight spools in the limited internal volume of a 5 U rack mountable enclosure, i.e. 19 inches wide, 8.75 inches high, and 20 inches deep. The major drum must have a greater diameter than the minor drum so that a fiber optic cable F can be passed from the major drum to the minor drum through the aperture 71 in the intermediate flange and wound thereon. Extending flange diameter allows the major drum to hold more fiber optic cable, e.g. up to about 2500 meters of fiber optic cable. Maximum flange diameter is limited by the dimensions of the 5 U rack mountable enclosure. Minimum drum diameter is limited to twice the specified minimum bend radius specified for the fiber optic cable being spooled. The minimum drum diameter is typically 17 millimeter (0.7 inches). The dimensions were chosen to accommodate the lengths of fiber cable, while remaining small enough to allow eight spools to fit inside the enclosure.

Given the physical limitations of a 5 U rack mountable enclosure, recommended spool dimensions are quantified as follows.

TABLE 1

| | |
|---|---|
| Major drum diameter ($D_{major}$) | 42.4 mm to 482 mm |
| | (1.2 inches to 19.98 inches) |
| Major drum length ($L_{major}$) | 0.25 mm to 200 mm |
| | (0.01 inches to 7.875 inches) |
| Minor drum diameter ($D_{minor}$) | 17 mm to $D_{major}$ − 12.7 mm |
| | (0.7 inches to $D_{major}$ − 0.5 inches) |
| Minor drum length ($L_{minor}$) | 0.25 mm to 200 mm |
| | (0.01 inch to 7.785 inch) |
| Flange diameter | $D_{major}$ + 0.25 mm to 482 mm |
| | ($D_{major}$ + 0.01 inch to 19 inches) |

Spools having these dimensions provide for the different lengths of fiber optic cable to be stored in a more compact space than was known here-to-for and facilitates bench-top calibrations in the laboratory. The single piece spools have an aperture through which the fiber end is passed to be coiled around a minor drum and provide access to both ends of the fiber. In one embodiment, spool diameter is 4 inches with a retaining flange diameter of 6 inches and a total width of 2 inches.

Single-mode and multi-mode fibers are wound on the spools. They are each wound by the same spooling method described herein. The ADFOCS includes both single-mode and multi-mode spools because some OTDRs have both multi-mode and single-mode capability, and this eliminates the need for two separate boxes to calibrate a single OTDR instrument.

All of the features of the ADFOCS OTDR calibration standard are built into a single, compact rack mountable enclosure. Mounting the enclosure in a rack protects the delicate spool wound fiber optic cable from damage that can be caused by normal movement. The unit holds 4 different lengths of multi-mode fiber optic cable on spools, and 4 different lengths of single-mode fiber optic cable on spools. The unit is made to be able to be mounted in a standard 19-inch equipment rack, and occupies 5 U of rack space, i.e. 8.75 inches vertically, and is 20 inches deep. This compact size allows it to be conveniently placed on a laboratory bench top, or in an instrumentation rack.

The physical length of the fiber optic cable on each spool is carefully measured with a spooling machine, which is equipped with a digital encoder with a length resolution of 1 centimeter (cm), as well as a tension meter. It is important that the fiber optic cable be spooled with near-zero tension in order to prevent stretching of the fiber optic cable. The tension meter assures that the tension on the fiber optic cable is close to zero during the spooling process by providing real-time tension measurements. Each fiber optic cable is re-spooled at least 5 times, so that the lengths can be averaged, and a length uncertainty determined. The spooling machine allows for a length measurement repeatability of less than 5 centimeters (cm) at lengths up to 1000 meters (m).

The spooling machine itself is calibrated using a sample fiber optic cable artifact. The sample fiber optic cable artifact has several marks along its length. The fiber optic cable is laid on a long flat surface, and the distances between the marks are measured using a laser tracking device, which is directly traceable to length standards at the National Institute of Standards and Technology, and has length measurement uncertainties of less than 0.1 millimeter (mm). This fiber optic cable artifact is put into the spooling machine, and the distance to each of the marks is compared to the spooling machine reading. Thus, a correction factor is created for the spooling machine and applied to the spooled lengths of fiber optic cable used in the ADFOCS standard. The ADFOCS standard uses four spools of fiber optic cable of different lengths, ranging from a few tens of meters, to a few thousand meters, depending on the application. One example of lengths in the ADFOCS is lengths of 80 meters, 210 meters, 505 meters, and 1060 meters. The lengths are chosen based on the application so that they may be combined without causing confusion due to ghosting. Ghosting is the repetition of a signal at integer multiples of a given length. Therefore, none of the four lengths are close to integer multiples of another length.

A distinction is made between the "physical" length and "optical" length of a fiber optic cable. Physical length is measured against a length standard. Optical length is measured against a time-of-travel of light. These two types of length are not equivalent, even though for applications requiring less precision they are sometimes used interchangeably, or in the alternative referred to as the fiber optic cable length. Some applications use lengths of fiber optic cable where the physical length is known within ±10%, or even ±1%. These lengths are known physical lengths. For purposes of describing the invention physical length accuracy of ±0.005% is referred to as "accurately" known physical length.

The index of refraction for a fiber optic cable is generally known with a precision of 3 decimal places, i.e. ±0.001. Some manufacturers also indicate on the cable spool that the fiber optic cable index of refraction measurement is accurate within ±0.0001. However, the index of refraction printed on the spool is an average index of refraction reported for the whole spooled fiber optic cable length since the instantaneous index of refraction varies along the length of all fiber optic cables due to imperfections in manufacturing. Shorter lengths of fiber optic cable taken from the longer spool will demonstrate a slightly different index of refraction from the average of the longer supply spool. Therefore, the index of refraction of a cable segment may differ from the average of the supply spool from which it was taken. The ADFOCS spools are each individually characterized for index of refraction after they are taken from the supply spool, with a precision of ±0.00001 or 10 ppm. This accuracy is achieved by time-of-flight measurements with an uncertainty of ±50 ps (pico seconds, $10^{-12}$ seconds) or less.

Many manufacturers create calibration fiber optic cable spools by measuring their lengths using an OTDR. The OTDR-measured lengths are then used to calibrate other OTDRs. This method for determining the length of a fiber optic cable is not acceptable for applications requiring high accuracy. The ADFOCS fiber optic cables have both physical length and index of refraction measured by measurement instruments with measurement traceability to a national or intrinsic standard. The physical length was measured using the spooling machine which in turn was calibrated against a laser tracker with sub-millimeter accuracy, which was calibrated against length standards derived from the national length standards at the National Institute of Standards and Technology (NIST). The index of refraction was calculated from the time-of-flight measurements, which were made on a time-of-flight system whose accuracy is tied to a rubidium time-standard. This is a national time standard. Rubidium is an intrinsic time standard. Therefore, the spooled fiber optic cable characteristics were measured independently from any OTDR, thus distinguishing it from other spools commonly used in practice.

The spooling machine is a modified UniSpooler machine available from Showmark LLC, Exton, Pa. 19341. The UniSpooler machine is modified by adding an adjustable mechanical damper placed on the feed spool axle, a tension meter that displays real-time tension in the spooled fiber, and spooling speed indicator.

The invention also provides for attenuation and scattering loss calibration measurements. Attenuation measurements are the result of Fresnel reflections at certain points along the length of the fiber optic cable. Since Fresnel reflections reflect larger amounts of energy, there is a decrease in forward moving energy. The amount of energy lost in the reflection is the attenuation at that point. The invention includes a segment of fiber optic cable with a variable optical attenuator (VOA) attached in series. The unit also contains a multi-mode VOA (MMVOA) and a single-mode VOA (SMVOA), each coupled to a corresponding one of the fiber optic cable spools. The multi-mode fiber optic cables are characterized for the index of refraction at wavelengths of 850 nanometers (nm) and 1300 nanometers (nm). The single-mode fiber optic cables are characterized for index of refraction at wavelengths of 1310 nanometers (nm) and 1550 nanometers (nm).

The VOA attenuation can be adjusted to a known loss, and the OTDR measurement can be compared against the known loss value. Scattering loss is due to Rayleigh scattering all along the length of the fiber optic cable. For measurement purposes, scattering loss does not exist at any particular point, but rather it is a measure of the energy loss per unit length along the length of the fiber optic cable. The spools of fiber optic cable in the ADFOCS have been characterized for scattering loss, so that the OTDR measurements can be compared with the known ADFOCS quantities.

The VOAs used in the ADFOCS are selected, among other reasons, because of their very small form factor. However, this small form factor does not allow for a built-in user interface on the VOA. The VOA attenuation is set by sending and receiving serial communications commands to and from the VOA. In order to retain the single unit approach to the ADFOCS, a built-in VOA controller is utilized. The controller provides a graphical user interface (GUI), whereby the user can control the VOA set points. The controller is a very small embedded Linux processor, with software. The software includes the GUI for the VOA, as well as provides a convenient place to display the fiber optic characteristics of the spooled fiber.

Figure 1:
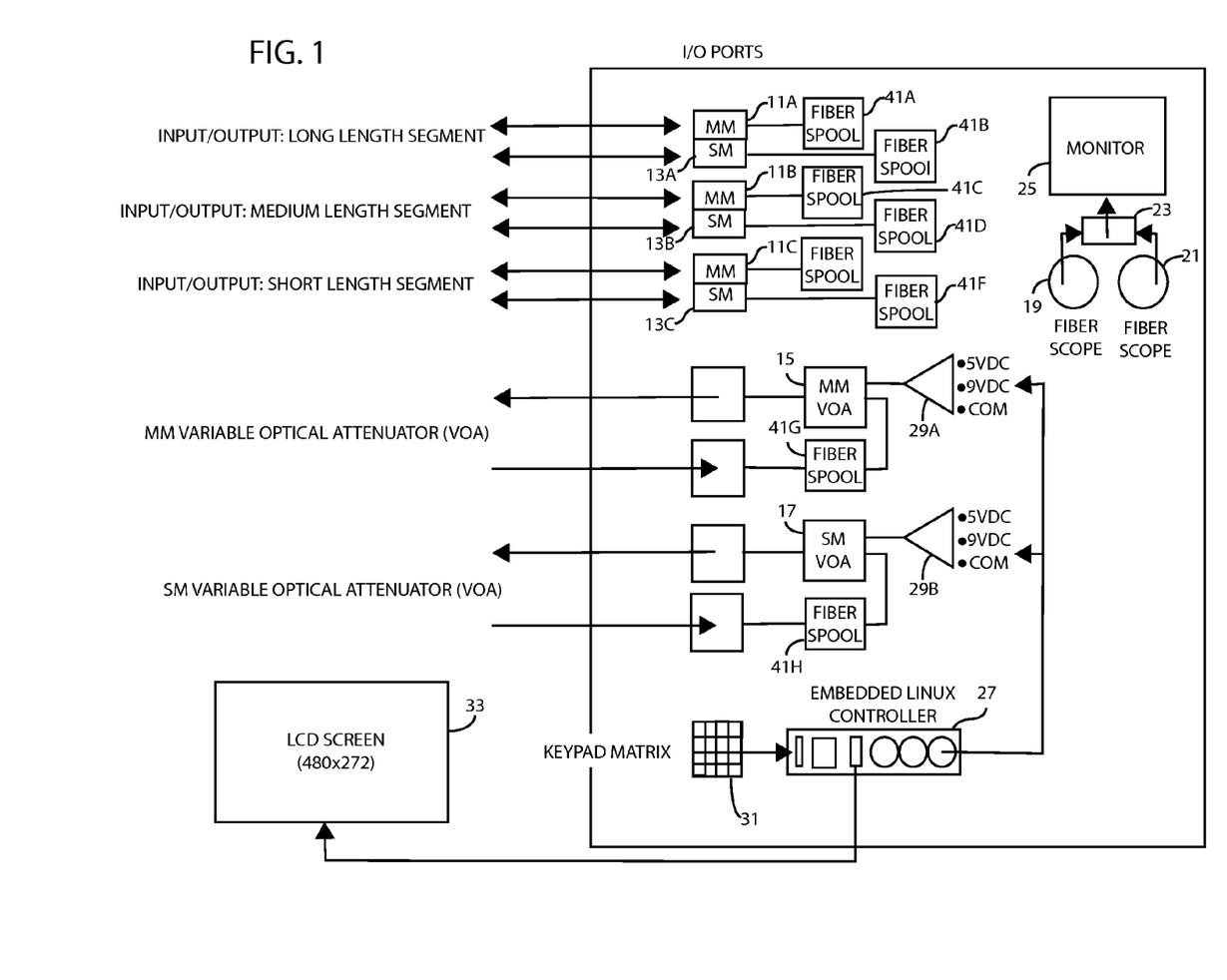
FIG. 1 is a schematic block diagram showing the elements of the invention.
Figure 2:
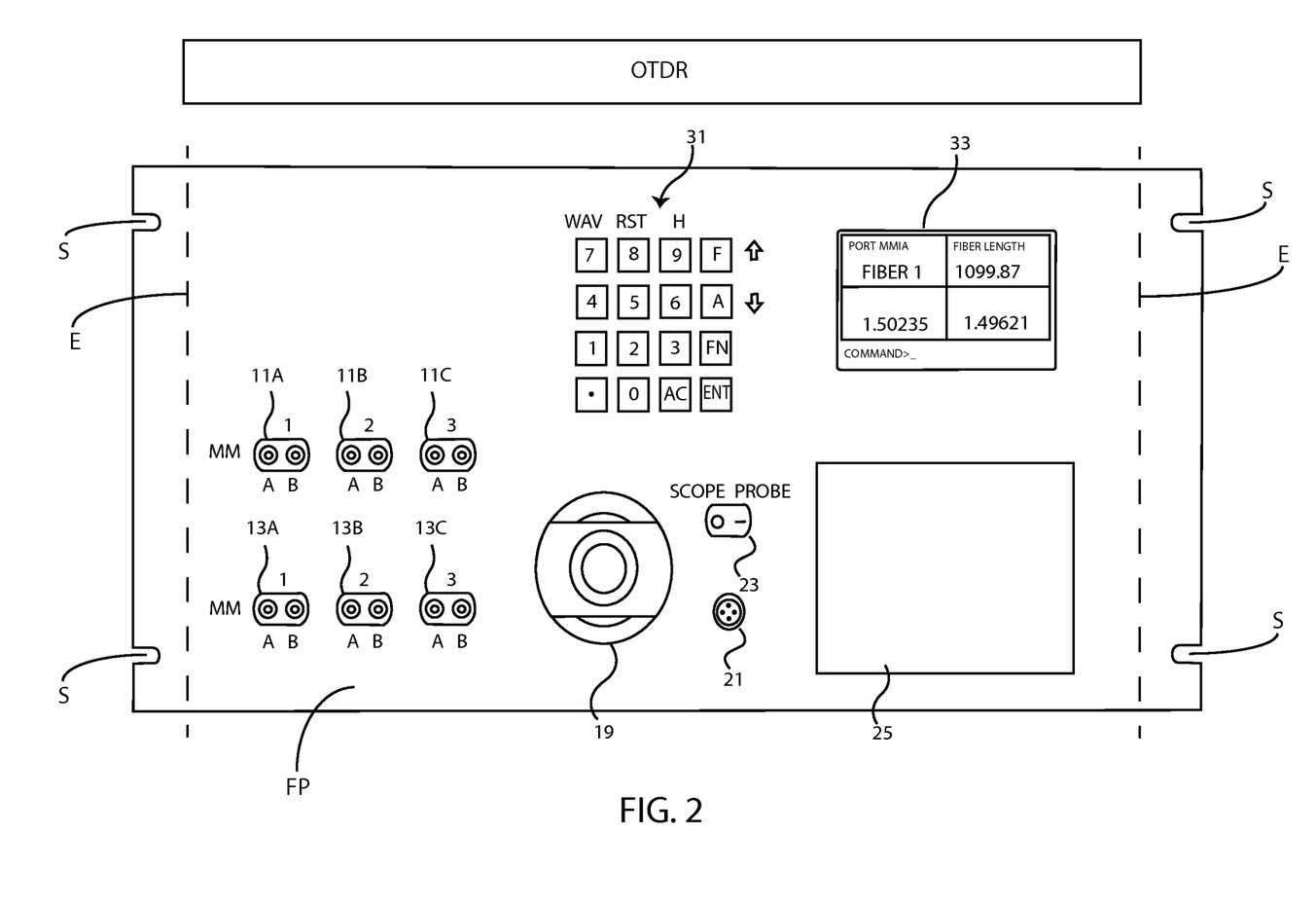
FIG. 2 is a view of a front panel of a rack mountable enclosure used to implement the invention.

FIG. 1 shows the elements of the invention in block diagram form. FIG. 2 shows the front panel FP of an ADFOCS according to the invention including an enclosure E shown in phantom lines behind front panel FP and four slots s for rack mounting. With reference to FIGS. 1 and 2, the invention includes three multi-mode (MM) input/output ports 11A, 11B and 11C and three single-mode (SM) input/output ports 13A, 13B and 13C. The invention also includes a multi-mode VOA 15 and single-mode VOA 17. The invention also includes a fiber scope 19, fiber probe 21 and a selector switch 23 connected to the fiber scope 19 and fiber probe 21, and a monitor 25. The selector switch 23 provides as an input to the monitor 25 either fiber scope 19 or fiber probe 21, depending on its position.

Embedded controller 27 connects to com port 29A and com port 29B used by multi-mode VOA 15 and single-mode VOA 17, respectively. The term "com port" is understood to refer to a serial port. Commands are entered to the controller via key pad matrix 31. Results of measurements and the like are displayed on LCD screen 33.

Figure 3:
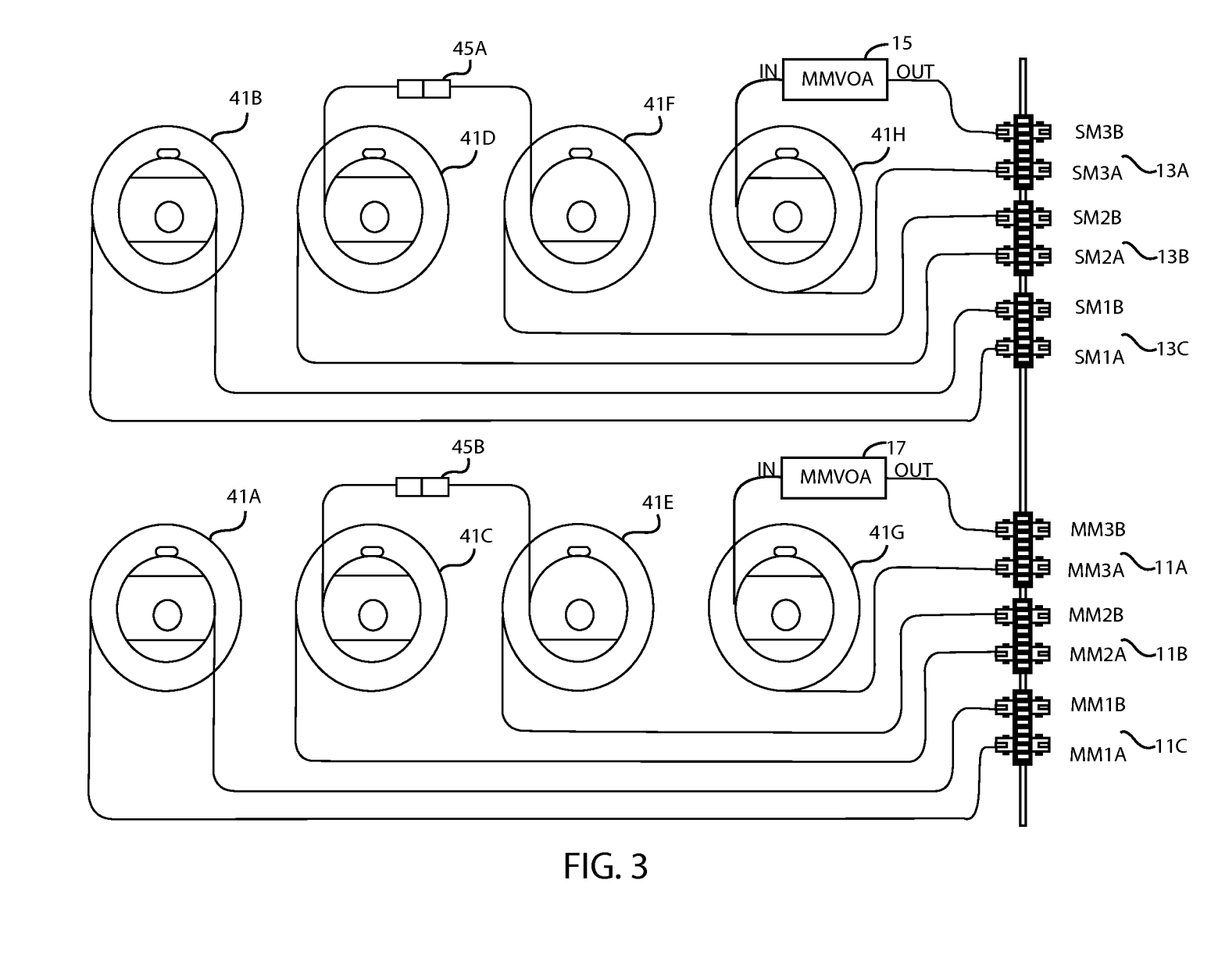
FIG. 3 is a schematic view of the fiber optic cable spools, VOAs and ports of the invention.

A total of eight fiber optic cable spools 41A-41H are connected to the I/O ports and VOAs. FIG. 3 schematically shows the relationship between the eight fiber optic cable spools and the three pairs of multi-mode ports 11A-11C and three pairs of single-mode ports 13A-13C.

Also shown in FIG. 3 are connectors 45A and 45B connecting spools 41D/41F and spools 41C/41E, respectively. The connectors typically have a loss between 1.0 and 1.5 dB which the OTDR uses to detect the fact that a connection exists so that the two connected spools can be connected to a single input/output port. In a typical embodiment, the three single-mode spools and the three multi-mode spools have fiber optic cable lengths of 1000 meters, 500 meters and 210 meters, respectively. However, the lengths do not always have to be the same for each embodiment. For example, in another embodiment, the lengths are 2000 meters, 700 meters and 250 meters. The important thing is that the two fiber lengths that are connected together (the 700 meters and 250 meters spools, or the 500 meters and 210 meters spools) are not integer multiples. The three lengths are selected to cover the distance range that the OTDRs are being used to measure. When the OTDR is connected to the 500 meter side, the OTDR will see the 500 meter length, then a blip will appear where the connector exists, and then it will show the remaining 210 meters of fiber. Both the 500 meter and 210 meter lengths can be tested this way. As a form of secondary validation, the OTDR is connected to the 210 meter side. The OTDR being calibrated will see the 210 meter spool, then a blip at the connector, then the 500 meter spool. The two measurements are compared thereby allowing a comparison of the same length of fiber optic cable at two different places in the fiber optic cable network.

Figure 4:
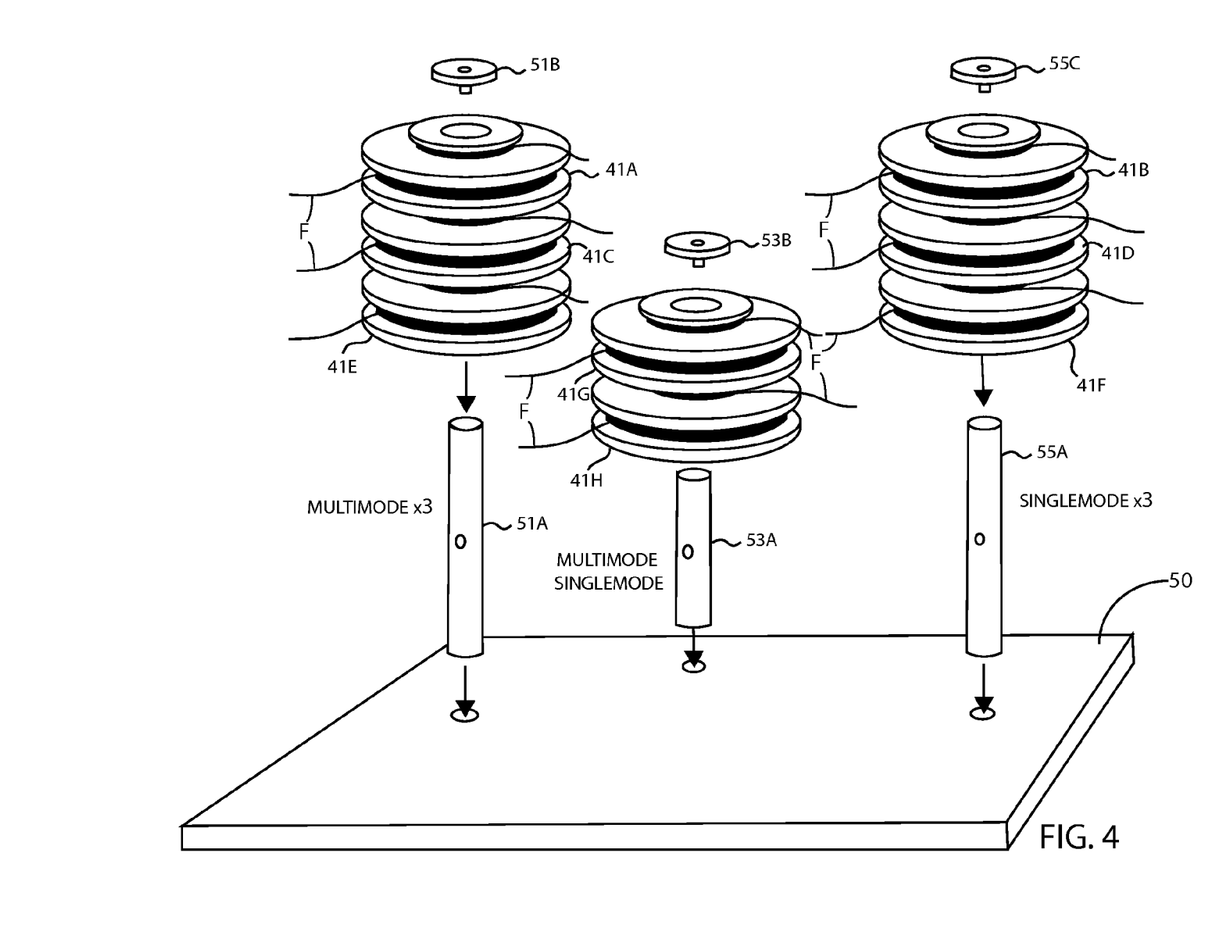
FIG. 4 shows the arrangement of spindles and fiber optic cable spools on a horizontally disposed base plate.

FIG. 4 shows the actual layout of the eight spools which enables the compact design of the ADFOCS. As shown, multi-mode spools 41A, 41C and 41E are stacked on top of each other and aligned onto a base plate 50 with a spindle 51A and a cap 51B. The spools for the multi-mode and single-mode VOAs 41G and 41H are similarly arranged on the horizontally disposed base plate 50 using spindle 53A and cap 53B. The three single-mode spools 41B, 41D and 41F are similarly arranged using spindle 55A and cap 55C. Fiber optic cable F is wound on the spools.

Figure 5:
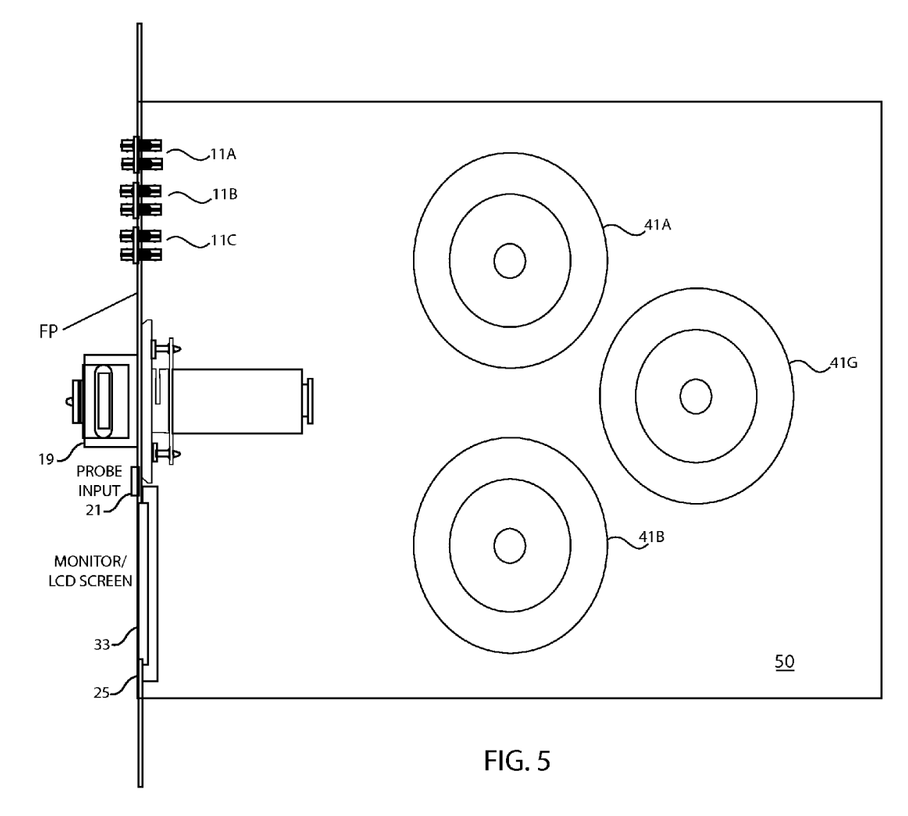
FIG. 5 shows how some elements of the invention are arranged relative to the face plate.

FIG. 5 is a diagram showing a physical orientation of the spools relative to the front panel FP of the ADFOCS, fiber optic cable connectors 11A, 11B, and 11C, as well as fiber scope 19, probe input 21, LCD screen 33 and monitor 25.

FIGS. 6A and 6B illustrate the design of a single fiber optic cable spool of the type utilized according to the invention. Each spool has a first terminal flange 65 having cable contact surface 65' and a second terminal flange 61 whose diameter is less than or equal to the diameter of intermediate flange 63 having cable contact surface 63'. A slight chamfer is provided to reduce any fiber optic cable bending as it is spooled. Chamfer c is shown on intermediate flange 65 and chamfer c' is shown on second terminal flange 61. A major drum 67 having a cable receiving surface 67' is integrally formed between intermediate flange 63 and first terminal flange 65. A minor drum 69 has a cable receiving surface 69'. Minor drum 69 has a diameter $D_{minor}$ which is smaller than the major drum 67 diameter $D_{major}$. Minor drum 69 connects second terminal flange 61 to intermediate flange 63. Aperture 71 has sufficient free area so that a fiber optic cable F is able to pass through it so that a single length of cable F can be spooled onto each of the eight fiber spools and able to be passed from the major drum to the minor drum. In this manner, both ends of a length of fiber cable can be readily accessed. Relative dimensions of spools are recited in Table 1.

The ADFOCS includes an attenuation calibration capability for OTDRs. This attenuation calibration is enabled by the variable optical attenuators (VOA), both multi-mode and single-mode. OTDR designs vary, and some require an extra length of fiber after the attenuator to make the attenuation measurement. For this reason, an 80-meter spool of fiber optic cable 41G or 41H is attached to one end of each VOA. Other OTDRs need the length of fiber before the attenuator. For this reason, both ends of the fiber/VOA path are available on the front panel through ports 11A and 13A.

The VOAs are commercially available devices (Oz Optics Ltd. DD-100 models). However, they require computer control using RS-232 serial communications. The ADFOCS was designed with an embedded Linux micro-controller that eliminates the need for an external computer to control the VOAs. FIG. 1 shows that the embedded Linux controller connected to the COM (RS-232 communications) ports of the VOA. The VOA also requires 5 volts DC for its internal logic circuitry and 9 volts DC for its internal stepper motor. The embedded Linux controller also requires the same 5 volts DC. The embedded Linux controller has a user interface which is shown on LCD screen 33, mounted to the front panel FP. The user controls the ADFOCS functions with keypad matrix 31, also mounted to the front panel. The embedded Linux controller also displays the characteristics of the fiber spools (index of refraction, spooled lengths, calibrated wavelengths), which are needed for reference during the distance calibration of the OTDR.

Figure 7:
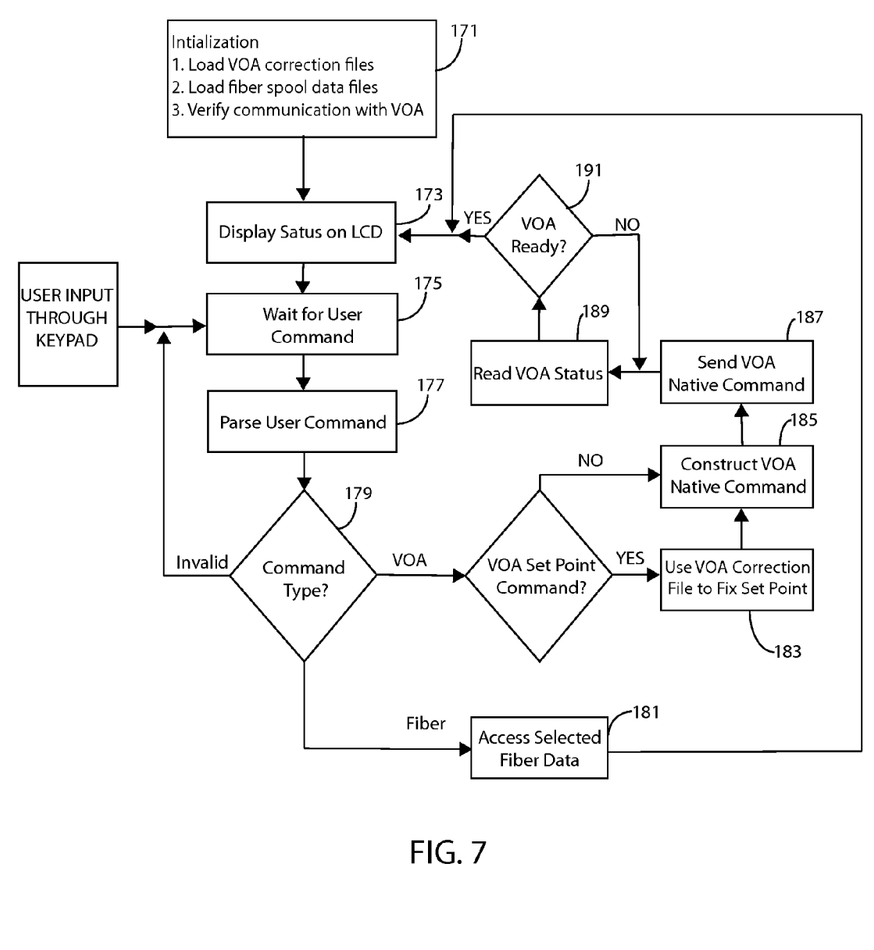
FIG. 7 is a flowchart showing an implementation of the variable optical attenuator (VOA) software.

The VOA software also implements a calibration file for more accurate control of the VOA attenuation set points. The VOA functions are controlled through the keypad 31 on the front panel FP, and its status is displayed on the LCD display 33 connected to the controller 27. FIG. 7 is a flowchart showing an implementation of the VOA control via software. Initialization 171 loads VOA correction files, and fiber spool data files. These two files contain data for setting the VOA to a calibrated attenuation level, and the characterized values of length and index of refraction for the spooled fiber optic cables. The status is displayed 173 on LCD display 33. The software remains in an idle state 175 until a user command is entered which is then parsed 177. Details regarding idle states and parsing commands are well known in the art. The command entered is determined 179 to be a VOA or Fiber command. If Fiber, a data file is selected 181 meaning a text file stored in the microcontroller that has measurement calibration data for the VOA. If a VOA command is entered, if it is a VOA set point command, the VOA correction file is used to fix the set point 183. Otherwise, a VOA native command is constructed 185 meaning a sequence of ASCII-based bytes that the VOA recognizes as a valid operational command. The VOA native command is sent 187 and used to read VOA status 189. That is, the microcontroller will check the status of completion of the last command by sending a native command query through the COM port, and will not allow further commands until the VOA command is completed and the VOA query indicates that the VOA is ready to receive another command. Then if the VOA is ready 191, its status is displayed on LCD 33. If the VOA is not ready, the software loops back to read VOA status again. This loop repeats until the VOA is ready.

An extremely important aspect of making fiber optic measurements is fiber connector cleanliness. Several millions of dollars are spent annually on repairs and maintenance due to improperly cleaned fiber connectors. Even the smallest amount of debris on a fiber connector end-face can drastically impair fiber optic measurements. Compliance with this requirement is difficult to obtain in practice. To provide an easier and more convenient solution which enhances compliance, the invention incorporates two types of fiber optic visual inspection scopes (FOVIS) built into the front panel of the unit. This is very different from other systems, because the inspection scopes are always completely separate, separately powered, and, therefore, seldom used. An internal fiber optic microscope allows the user to insert the fiber connector into the scope to check for cleanliness before connecting to the spools of the ADFOCS. The built-in fiber end-face inspection system includes a LCD monitor 25. This inspection system is powered when the unit is powered. The scope input is located right next to the ADFOCS ports, so it is very easy and practical to inspect the fiber connectors before connecting to the ports.

The internal FOVIS uses a 400× magnification and CCD, and displays the fiber connector end on the built-in LCD monitor 25. An external FOVIS connects to the front panel of the ADFOCS with a built-in connector that provides power to the external FOVIS, and a signal line, which can be switched to the built-in monitor. This built-in approach provides the ability to make connections to the ADFOCS and check for cleanliness all at the same point, namely, at the front of the unit. This approach eliminates the reasons for failure to clean the connectors, which is typically done off to one side of the laboratory bench. There is no inconvenient moving of cables and equipment to the cleaning area and then back to the calibration standard every time a cable is connected to the front panel. With a built-in inspection design, the cleaning can be performed without moving cables and equipment to another area. This provides the user the ability to save substantially on maintenance and repair costs.

The ADFOCS is used to calibrate the OTDR by connecting the OTDR to the input/output ports 11A-11C or 13A-13C using a simple fiber optic patch cable (not part of the ADFOCS). There are three different input/output port types, corresponding to the three different lengths of spooled fiber connected to each port. There is a long length spool, medium length spool, and short length spool. For each of these spool lengths there is a multi-mode spool and a single-mode spool, making a total of six fiber spools for distance calibrations. Multi-mode OTDRs are calibrated using only use the multi-mode spools. Single-mode OTDRs are calibrated using only the single-mode spools.

The following is an operational description explaining how to use the invention.

Fiber Connector Inspection
1. Before connecting a fiber optic cable to any port, insert one end of the cable into the scope on the front panel of the ADFOCS.
2. Make sure the SCOPE/PROBE switch 23 is set to SCOPE.
3. Adjust the focus as necessary to view the fiber cable connector end face.
4. Inspect the connector for cleanliness, and clean as necessary. The key to proper cleaning is to follow these basic steps:
   a. Inspect
   b. Clean
   c. Re-inspect
5. Insert the cleaned end of the fiber patch cable into the desired port 11A-11C or 13A-13C on the ADFOCs front panel.
6. Insert the other end of the fiber patch cable into the scope, then inspect, clean, and re-inspect the connector.
7. Attach the PROBE to the front panel, under the SCOPE/PROBE switch 23. Tighten the retaining nut.
8. Set the SCOPE/PROBE switch 23 to PROBE.
9. Use the probe to inspect the test instrument connector for cleanliness. Use only approved fiber cleaners to clean the inside of the test instrument connector.
10. Remove the fiber cable connector from the scope and attach it to the test instrument.

OTDR Distance Calibration
1. Attach the fiber cable to a port 11A-11C or 13A-13C on the front of the ADFOCS. Use the front panel keypad to select the port being used and to display information for that fiber.
2. The fiber length is shown in the upper right cell. The index of refraction at one characteristic wavelength is shown in the lower left cell. The index of refraction at a second characteristic wavelength is shown in the lower right cell.
3. Enter the index of refraction for the OTDR wavelength being used.
4. Run a measurement on the OTDR.
5. Verify that the OTDR indicates the length shown on the ADFOCS display within the required tolerance. NOTE: If a short fiber patch cable is used, the OTDR may not distinguish it from the fiber segment length of the ADFOCS. Measure the length of the fiber patch cable, and subtract it from the OTDR measurement. The difference should be compared to the length shown on the ADFOCS display.
6. Remove the patch cable connector from the ADFOCS panel, re-clean, and insert into the next desired port.

In this manner, it is possible to calibrate an OTDR by connecting an OTDR to be calibrated to an input port of a calibration device having a known length and index of refraction of fiber optic cable. An index of refraction for an OTDR wavelength of the OTDR to be calibrated is entered into the OTDR. Then the calibration device is used to calibrate the OTDR by comparing a display of the known length of the fiber optic cable with a length as displayed by the OTDR. The calibration device included three single piece spools, each for storing different predetermined lengths of single-mode fiber optic cable, three single piece spools, each for storing different predetermined lengths of multi-mode fiber optic cable. Two single piece spools each store a predetermined length of single-mode fiber optic cable and multi-mode fiber optic cable, respectively. Input ports couple ends of single-mode fiber optic cables and ends of multi-mode fiber optic cables stored on corresponding spools. Output ports each couple to a second end of one of the single-mode fiber optic cables, and a second end of one of the multi-mode fiber optic cables. A single-mode variable optical attenuator is coupled to one end of a single-mode optical cable. A multi-mode variable optical attenuator is coupled to one end of a multi-mode optical cable. Additional output ports are coupled to the single-mode variable optical attenuator and multi-mode variable optical attenuator. A display displays parameters of fiber optic cables plugged into the input and output ports which are used to calibrate the OTDR.

Although specific details are provided regarding the implementation of a suitable calibration device, such specific details should not be construed as limiting the invention other than as provided in the following claims.

What is claimed is:

1. In combination with an apparatus for calibrating distance and attenuation parameters of an optical time domain reflectometer (OTDR), a fiber optic cable calibration standard apparatus comprising:
   a rack mountable enclosure having a front panel and containing therein, a horizontally disposed base plate and three fiber optic cable spool assemblies,
   in the three fiber optic cable spool assemblies, each assembly comprising a vertically elongated spindle having a lower end fixedly attached to the base plate and an upper end terminated with a cap, and fiber optic cable spools rotatably mounted on the vertically elongated spindle between the base plate and the cap,
   in the fiber optic cable spools, each spool comprising a drum portion and a flange portion:
      a. the drum portion comprising a major drum having a major drum fiber optic cable receiving surface of a first diameter and a minor drum having a second diameter of lesser magnitude than the first diameter,
      b. the flange portion comprising:
         i. a first terminal flange spaced by the drum portion from a second terminal flange and an intermediate flange, each flange in the flange portion extending radially outwardly from the drum portion; the first terminal flange having a first terminal flange fiber optic cable contact surface abutting the major drum fiber optic cable receiving surface,
         ii. the intermediate flange positioned between the first terminal flange and the second terminal flange and separating the major drum from the minor drum, and having an aperture there through, directly adjacent the major drum fiber optic cable receiving surface, the aperture having a free area sufficient to pass a fiber optic cable length through the intermediate flange from the major drum fiber optic cable receiving surface to the minor drum,
         iii. the intermediate flange having an intermediate flange fiber optic cable contact surface abutting the major drum fiber optic cable receiving surface,
      c. each spool made of a material to form a single unitary device having smooth, gap-free contact surfaces including between the first terminal flange fiber optic cable contact surface and the abutting major drum fiber optic cable receiving surface and between the intermediate flange fiber optic contact surface and the abutting major drum fiber optic cable receiving surface;

a first set of fiber optic cable spools comprising:
first, second and third, spools, each spool storing a different predetermined length of single-mode fiber optic cable; the first set of fiber optic cable spools mounted on one of the spindles and forming therewith a first fiber optic cable spool assembly;
a second set of fiber optic cable spools comprising:
fourth, fifth and sixth spools, each spool storing a different predetermined length of multi-mode fiber optic cable; the second set of fiber optic cable spools mounted on one of the spindles and forming therewith a second fiber optic cable spool assembly;
a third set of fiber optic cable spools comprising:
seventh and eighth single piece spools, each spool storing a predetermined length of single-mode fiber optic cable and multi-mode fiber optic cable, respectively; the third set of spools mounted on one of the spindles and forming therewith a third fiber optic cable spool assembly;
first and second input ports each for coupling to one end of the single-mode fiber optic cables stored on a corresponding one of said first, second or third spools;
first and second output ports each for coupling to a second end of one of said single-mode fiber optic cables;
third and fourth input ports each for coupling to one end of multi-mode fiber optic cables stored on a corresponding one of said first, second or third spools;
third and fourth output ports each for coupling to a second end of one of said multi-mode fiber optic cables;
a single-mode variable optical attenuator for coupling to one end of a single-mode fiber optic cable stored on said seventh spool;
a multi-mode variable optical attenuator for coupling to one end of a multi-mode fiber optic cable stored on said eighth spool;
a fifth input port for coupling to a second end of said single-mode fiber optic cable stored on said seventh spool;
a sixth input port for coupling to a second end of said multi-mode fiber optic cable stored on said eighth spool;
a fifth output port coupled to said single-mode variable optical attenuator;
a sixth output port coupled to said multi-mode variable attenuator;
a display attached to the front panel, for displaying parameters of fiber optic cables coupled to said input and output ports.

2. The fiber optic cable calibration standard apparatus of claim 1 comprising:
a fiber optic microscope and monitor attached to the front panel, for inspecting a fiber optic cable connector end face.

3. The fiber optic cable calibration standard apparatus of claim 1 comprising:
a monitor and probe input attached to the front panel, for coupling to a probe for inspecting said first to sixth input and output ports.

4. The fiber optic cable calibration standard apparatus of claim 1 comprising:
a controller in the rack mountable enclosure for controlling set points of the single-mode and multi-mode variable optical attenuators.

5. A method for calibrating an optical time domain reflectometer (OTDR) comprising the steps of:
connecting an OTDR to be calibrated to an input port of the device for calibrating of claim 1, the input port connected to a fiber optic cable having a known physical length to an accuracy of about ±0.005% and a known index of refraction for a wavelength to a precision of ±10 ppm;
entering the known index of refraction for a wavelength to a precision of ±10 ppm into the OTDR to be calibrated;
calibrating the OTDR by comparing a display of the known length of the fiber optic cable to an accuracy of about ±0.005% with a length as displayed by the OTDR.

6. The method of claim 5 further comprising spooling fiber optic cable and measuring the time-of-flight for predetermined wavelengths of input laser light to obtain a known length accurate to about ±0.005% of the fiber optic cable and known index of refraction for a wavelength to a precision of ±10 ppm for use in the device for calibrating.

7. The method of claim 5 wherein the known index of refraction is derived from a time-of-flight measurement calibrated to a national time standard.

8. The method of claim 5 wherein the known index of refraction is derived from a time-of-flight measurement calibrated to an intrinsic time standard.

9. The method of claim 5 wherein the known physical length is calibrated to a national length standard.

10. The method of claim 5 wherein the known physical length is calibrated to an intrinsic length standard.

11. The method defined by claim 5 wherein said connecting, entering and using are performed for at least two different known lengths of fiber optic cable.

12. The method defined by claim 5, prior to said connecting:
cleaning a fiber optic cable connector used for said connecting using a fiber optic visual inspection scope.

13. The method defined by claim 5 wherein said fiber optic cable is a single-mode fiber optic cable.

14. The method defined by claim 5 wherein said fiber optic cable is a multi-mode fiber optic cable.

15. A fiber optic cable spool assembly comprising a vertically elongated spindle having a lower end fixedly attached to a horizontally disposed base plate, and an upper end terminated with a cap, and fiber optic cable spools stacked and rotatably mounted on the vertically elongated spindle, and fiber optic cable wound on each of the spools, and
in the fiber optic cable spools, each spool comprising a drum portion and a flange portion:
a. the drum portion comprising a major drum having a major drum fiber optic cable receiving surface of a first diameter and a minor drum having a second diameter lesser than the first diameter,
b. the flange portion comprising:
i. a first terminal flange spaced by the drum portion from a second terminal flange and an intermediate flange, each flange in the flange portion extending radially outwardly from the drum portion; the first terminal flange having a first terminal flange fiber optic cable contact surface in contact with the major drum fiber optic cable receiving surface,
ii. the intermediate flange positioned between the first terminal flange and the second terminal flange to separate the major drum from the minor drum, and having an aperture therethrough, contacting the major drum fiber optic cable receiving surface, the aperture having a free area sufficient to pass a fiber optic cable length through the intermediate flange from the major drum fiber optic cable receiving surface to the minor drum, iii. the intermediate flange having an intermediate flange fiber optic cable contact surface in contact with the major drum fiber optic cable receiving surface, iv. each spool molded of a polymer material to form a single unitary device having smooth, gap-free contact surfaces including between the first terminal flange fiber optic cable contact surface and the major drum fiber optic cable receiving surface and between the intermediate flange fiber optic contact surface and the major drum fiber optic cable receiving surface.

16. The fiber optic cable spool assembly of claim 15 wherein the spindle has a vertical length of less than 8.75 inches.

17. The fiber optic cable spool assembly of claim 15 wherein each drum portion has a diameter of about 4 inches, a width of about 2 inches and the flange portion has a diameter of about 6 inches.

18. The fiber optic cable spool assembly of claim 15 wherein the polymer material is polyoxymethylene.

\* \* \* \* \*